United States Patent
Bazer-Bachi et al.

(10) Patent No.: US 9,708,551 B2
(45) Date of Patent: Jul. 18, 2017

(54) REGENERATOR FOR CATALYSTS

(71) Applicant: IFP Energies Nouvelles, Rueil-Malmaison (FR)

(72) Inventors: Frederic Bazer-Bachi, Irigny (FR); Eric Lemaire, Anse (FR); Fabian Lambert, Chatou (FR)

(73) Assignee: IFP Energies Nouvelles, Rueil-Malmaison (FR)

( * ) Notice: Subject to any disclaimer, the term of this patent is extended or adjusted under 35 U.S.C. 154(b) by 0 days.

(21) Appl. No.: 14/847,069

(22) Filed: Sep. 8, 2015

(65) Prior Publication Data

US 2016/0068765 A1 Mar. 10, 2016

(30) Foreign Application Priority Data

Sep. 10, 2014 (FR) ...................... 14 58503

(51) Int. Cl.
*C10G 59/02* (2006.01)
*C10G 35/10* (2006.01)
(Continued)

(52) U.S. Cl.
CPC .............. *C10G 59/02* (2013.01); *B01J 8/12* (2013.01); *B01J 19/245* (2013.01); *B01J 38/02* (2013.01);
(Continued)

(58) Field of Classification Search
CPC .... C10G 35/10; C10G 59/02; C10G 2300/70; B01J 8/0015; B01J 8/085; B01J 8/125; B01J 38/16; B01J 38/22; B01J 38/44
See application file for complete search history.

(56) References Cited

U.S. PATENT DOCUMENTS 3,033,779 A * 5/1962 Fidelman .................. B01J 8/34
    208/127
6,103,652 A 8/2000 Brunet et al.
(Continued)

FOREIGN PATENT DOCUMENTS

EP 0872277 A1 10/1998
FR 2992873 A1 1/2014
FR 2995798 A1 3/2014

OTHER PUBLICATIONS

Search Report and Opinion from corresponding French Patent Application No. 14/58503 dated Apr. 30, 2015.

*Primary Examiner* — Brian McCaig
(74) *Attorney, Agent, or Firm* — Millen, White, Zelano & Branigan, P.C.

(57) ABSTRACT

The present invention concerns a moving bed catalyst regenerator (1) comprising a vessel (2) extending in a vertical direction, said vessel being divided into at least two regeneration zones extending along the vertical height of said vessel, in which particles of catalyst move under gravity, the regenerator being configured such that each regeneration zone is capable of separately regenerating a different composition of catalyst and in which each regeneration zone comprises, in succession and in the order in which the catalysts move:
 a) a combustion section (CO);
 b) an oxychlorination section (O) disposed below the combustion section and comprising means for bringing catalyst from the combustion section (CO) to the oxychlorination section (O);
 c) a calcining section (CA) disposed below the oxychlorination section.

20 Claims, 4 Drawing Sheets

(51) Int. Cl.
- *B01J 38/22* (2006.01)
- *B01J 19/24* (2006.01)
- *B01J 38/42* (2006.01)
- *B01J 38/02* (2006.01)
- *B01J 8/12* (2006.01)
- B01J 38/16 (2006.01)
- B01J 38/44 (2006.01)

(52) U.S. Cl.
CPC ............... *B01J 38/22* (2013.01); *B01J 38/42* (2013.01); *C10G 35/10* (2013.01); *B01J 2219/24* (2013.01)

(56) References Cited

U.S. PATENT DOCUMENTS

| | | |
|---|---|---|
| 2014/0008270 A1 | 1/2014 | Plais et al. |
| 2014/0083908 A1 | 3/2014 | Plais et al. |

\* cited by examiner

REGENERATOR FOR CATALYSTS

The present invention relates to the field of the conversion of hydrocarbons, and more particularly to that of catalytic reforming. The invention pertains to a regeneration reactor (or regenerator) for catalysts, to a catalytic reforming unit using a regenerator in accordance with the invention and also to a catalytic reforming process.

PRIOR ART

The reformation (or catalytic reforming) of naphtha type hydrocarbon cuts is well known in the refining field. Starting from these hydrocarbon cuts, this reaction can be used to produce bases for high octane number fuel and/or aromatic cuts for petrochemicals, while at the same time supplying the refinery with the hydrogen necessary for other operations.

The catalytic reforming process consists of bringing the hydrocarbon cut containing paraffinic compounds and naphthenes into contact with hydrogen and a reforming catalyst, for example platinum-containing catalyst, and of converting the paraffinic compounds and naphthenes into aromatic compounds with an associated production of hydrogen. Given that the reactions involved in the reforming process (isomerisation, dehydrogenation and dehydrocyclisation reactions) are endothermic, the effluent removed from the reactor is normally heated before sending it to the next reactor.

Over time, the reforming catalyst becomes deactivated due to coke being deposited on its active sites. As a consequence it is necessary, in order to maintain an acceptable productivity for the reforming unit, to regenerate the catalyst in order to eliminate the deposit and thus re-establish its activity.

Various types of reforming process exist. The first type concerns processes known as "non-regenerative"; the catalyst is kept in service for long periods, but its activity drops over time, which means that the temperature of the reactors has to be raised gradually, and thus the selectivity varies during the operating cycle. The reactors have to be taken offline, completely interrupting the production of the refinery in order to regenerate the catalyst before a production cycle.

In another catalytic reforming process known as "semi-regenerative", the catalyst is frequently regenerated in the case in which several reactors which contain the catalyst in a fixed bed are used. One of the reactors is in regeneration mode while the other reactors are in service; it then replaces one of the in-service reactors when its catalyst has to be regenerated, and in this manner, all of the reactors are alternately taken out of service for regeneration then put back into service without interrupting the operation of the unit.

Finally, there is the reforming process known as Continuous Catalytic Reforming (CCR), which means that the reaction is carried out in a reactor in which the catalyst flows continuously from top to bottom and regeneration is carried out continuously in an associated reactor, the catalyst being recycled to the principal reactor so as not to interrupt the reaction. Reference may be made to document FR 2 160 269, which discloses a catalytic reforming process with continuous regeneration of the catalyst using a plurality of moving radial bed reactors in series and a dedicated regenerator. In accordance with the process of FR 2 160 269, the hydrocarbon cut mixed with hydrogen is processed in succession in each of the reactors in series, while the catalyst passes continuously through all of the reactors. The catalyst recovered from the final reactor outlet is sent to the regenerator for regeneration, at the outlet from which the regenerated catalyst is progressively reintroduced into the first reforming reactor. Document U.S. Pat. No. 7,985,381 describes in detail a reforming catalyst regeneration reactor comprising a combustion zone, an oxychlorination zone and a calcining zone. The catalyst moves in a downward vertical direction in the regenerator. It passes from the oxychlorination zone to the calcining zone via an annular ring. A calcining gas injected into the bottom of the calcining zone passes through the bed of catalyst as a counter-current into the calcining zone, then is recovered in a second annular zone located at the periphery of the reactor. In this second annular zone, the oxychlorination gas is injected in order to be mixed with the calcining gas which has been recovered such that the mixture then passes through this oxychlorination zone. Other technological solutions exist for injecting the oxychlorination gas into the reactor other than via external baffles or a multipoint distributor; examples which may be cited include the tray type solution described in the document FR 2 992 874 and the mixing box type solution disclosed in document FR 2 993 794.

The prior art reforming processes generally use a single type of catalyst for carrying out the conversion into aromatics. However, the preponderant reactions are not always the same as the reforming reaction progresses; the naphthene dehydrogenation reactions to form aromatics tend to take place to a greater extent in the first reaction zones, while the reactions of dehydrocyclisation of paraffins to form aromatics and hydrocracking principally take place in the final reaction zones. At the same time, the quantity of coke on the surface of the catalyst increases mainly in the final reaction zones.

Thus, it appears that "Continuous Catalytic Reforming" reforming processes using a single type of catalyst to carry out all of the catalytic reactions required can be improved in terms of efficiency, and thus from the point of view of the conversion yield.

SUMMARY OF THE INVENTION

One aim of the invention is to provide a regenerator which is capable of treating at least two different types of reforming catalysts simultaneously or separately. The regenerator of the invention may thus be employed in a continuous catalyst reforming unit employing at least two different types of catalysts which are adapted to carry out specific catalytic reactions as a function of the state of advance of the conversion.

Thus, the present invention concerns a moving bed catalyst regenerator comprising a vessel extending in a vertical direction, said vessel being divided into at least two regeneration zones extending along the vertical height of said vessel. Particles of catalyst move under gravity in each of said regeneration zones. The regenerator is configured such that each regeneration zone is capable of separately regenerating a different composition of catalyst and in which each regeneration zone comprises, in succession and in the order in which the catalyst moves:

a combustion section;
an oxychlorination section disposed below the combustion section and comprising means for bringing catalyst from the combustion section to the oxychlorination section; and
a calcining section disposed below the oxychlorination section.

The regenerator in accordance with the invention can thus be used to pool the treatment of at least two different types of catalyst which are adapted to specifically carry out the reactions involved in the catalytic conversion of naphtha cuts into aromatics.

The regenerator of the invention can advantageously be used to treat the catalysts under specific operating conditions for each type of catalyst, for example with different catalyst flow rates or with different reactive gas flow rates, or even with different gas compositions.

The regenerator of the invention may be varied so as to be capable of regenerating more than two catalysts with different compositions, for example three or four catalysts with different compositions. The term "composition" means the elements which constitute the catalyst, namely the support and the active metallic phase.

In accordance with one embodiment, each of the combustion sections comprises an annular space defined by two sieves which are permeable to gas and impermeable to catalysts in which the catalyst moves under gravity.

Alternatively, each of the combustion sections is formed by a portion of an annular space, the annular space being defined by two sieves which are permeable to gas and impermeable to catalysts and divided into portions by separation means which are impermeable to catalysts and also optionally impermeable to gas, said portions being capable of respectively containing catalysts with different compositions. As an example, the sieves are selected from a screen and a perforated plate.

In accordance with a preferred embodiment, each oxychlorination section is obtained by partitioning a zone of the vessel into compartments by a separation means which is impermeable to catalysts. In a preferred embodiment, the separation means is also impermeable to gas.

Preferably, each calcining section is obtained by partitioning a zone of the vessel into compartments by a separation means which is impermeable to catalysts. In a preferred embodiment, the separation means is also impermeable to gas.

In accordance with an advantageous embodiment, the oxychlorination section is separated from the calcining section by a mixing section which is configured to carry out mixing of an oxychlorination gas with a calcining gas.

Another aim of the invention is to propose a catalytic reforming unit and a reforming process which are optimized both from the point of view of the use of the catalysts and the operating costs.

Thus, the invention provides a continuous catalytic reforming unit comprising:
  at least a first reaction zone and at least a second reaction zone, the first and second reaction zones respectively containing at least a first moving bed of a first catalyst and at least a second moving bed of a second catalyst the composition of which differs from that of the first catalyst;
  a regenerator in accordance with the invention which is capable of simultaneously and separately regenerating the first and second catalysts;
  means (47')for transferring effluent obtained from the first reaction zone to the second reaction zone;
  means for bringing the first catalyst from the first reaction zone to the regenerator;
  means for bringing the second catalyst from the second reaction zone to the regenerator;
  means for transferring the regenerated first catalyst from the regenerator to the first reaction zone;
  means for transferring the regenerated second catalyst from the regenerator to the second reaction zone.

In accordance with one embodiment, the first and second reaction zones are disposed in a vertical stack in a reactor.

Alternatively, the first and second reaction zones are respectively disposed in at least a first reactor and at least a second reactor which are arranged side by side.

Preferably, the moving beds of catalyst from the first and second reaction zones are contained in an annular space defined by two cylindrical screens which are spaced apart, said screens being permeable to gas and impermeable to catalysts.

The invention also concerns a process for catalytic reforming of a hydrocarbon feed, comprising the following steps:
  a) treating the hydrocarbon feed in the presence of hydrogen in at least a first reaction zone comprising at least one moving bed comprising a first catalyst;
  b) continuously and separately withdrawing an effluent and the first catalyst from the first reaction zone;
  c) treating the effluent obtained from the first reaction zone in the presence of hydrogen in at least a second reaction zone comprising at least one moving bed comprising a second catalyst with a composition that differs from that of the first catalyst;
  d) continuously and separately withdrawing an effluent of converted hydrocarbons and the second catalyst from the second reaction zone;
  e) sending the first and second catalysts to a regenerator in accordance with the invention and regenerating said catalysts;
  f) separately sending the regenerated first and second catalysts to the respective first and second reaction zones.

Preferably, the flows of the feed, the effluents, the first and second catalysts in the moving beds are as co-currents in a downward direction. Preferably, the moving beds are of the "radial" type.

In one embodiment, the first and second reaction zones are disposed in a vertical configuration in a reactor with the first reaction zone being located above the second reaction zone.

Alternatively, the first and second reaction zones are disposed side by side respectively in at least a first reactor and at least a second reactor.

In the context of the invention, the process may comprise more than two reaction sections which each operate with catalysts with different compositions. As an example, the process may employ three or four reaction sections in series. It is clearly possible to use one more moving beds of catalyst per reaction section.

DETAILED DESCRIPTION OF THE INVENTION

Other characteristics and advantages of the invention will become apparent from the following description made with reference to the drawings, in which.

BRIEF DESCRIPTION OF THE DRAWINGS

Figure 1:
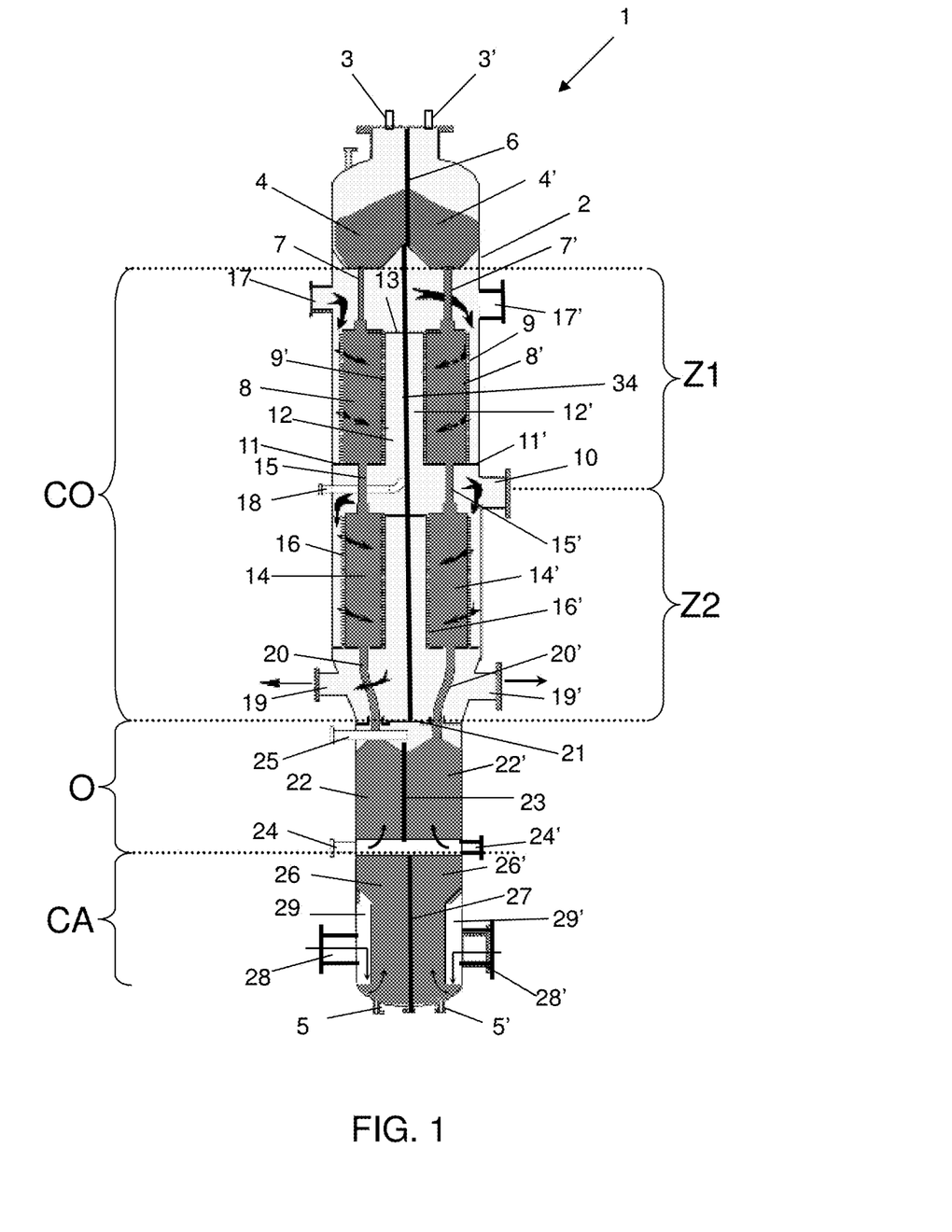
FIG. 1 represents a sectional view in a vertical plane of a catalyst regenerator in accordance with the invention.

In FIG. 1, the catalyst regeneration reactor (or regenerator) is composed of a vessel 2 which is essentially cylindrical in shape, comprising combustion sections CO, oxychlorination sections O and calcining sections CA. The vessel may be in the form of a cylinder with a vertical axis, the cylinder being closed at its ends. The combustion CO, oxychlorination O and calcining CA sections are superimposed in the reactor 1. In the reactor 1, these sections may be of the same diameter, or they may have different diameters. In FIG. 1, the regenerator 1 comprises two regeneration zones extending along the vertical axis from the top to the bottom of the reactor which are configured to regenerate two types of catalyst with different compositions in a simultaneous manner. The catalysts to be regenerated are introduced into the head of the reactor 1 via one or more conduits 3 and 3' respectively communicating with reservoirs 4 and 4' such that the catalysts with different compositions contained in said reservoirs are not mixed inside the regenerator. After passing through the regeneration section, the catalysts are evacuated from the reactor 1 via the conduits 5 and 5' located at the bottom of reactor 1. Under the effect of gravity, the catalysts move from top to bottom in the reactor, passing through the regeneration zone which comprises the combustion CO, oxychlorination O and calcining CA sections in succession. The catalysts are in the form of solid grains, for example in the form of beads with a diameter in the range 0.5 to 20 mm, in order to facilitate their movement in the reactor 1. The grains of catalyst are composed of a porous support, for example an alumina, onto which various compounds have been deposited, in particular platinum and chlorine, and optionally tin, rhenium, indium and/or phosphorus. The catalysts to be regenerated moving in each regeneration zone generally have different degrees of coking, for example approximately 5% by weight of coke.

The catalysts with different compositions respectively introduced into the reactor 1 via the conduits 3 and 3' arrive in the reservoirs 4 and 4' which can supply the combustion sections CO of the regenerator with catalysts. The reservoirs 4 and 4' are separated from each other by a separation means 6, for example a metal plate. The plate 6 may be solid or perforated, provided that the openings are smaller than the minimum distance measured between two opposite points of a grain of catalyst so that the catalysts cannot pass through said plate 6.

In the example of FIG. 1, for each regeneration zone, the regenerator contains a combustion section CO which can be used to carry out combustion of coke deposited on the catalysts. A combustion section CO may comprise one or more stages. The reactor 1 of FIG. 1 comprises two stages Z1 and Z2 of identical design. In accordance with a particular embodiment, the combustion section CO may also comprise a combustion control zone, for example such as that described by the document FR 2 761 907. As can be seen in FIG. 1, the two catalysts with different compositions contained in the reservoirs 4 and 4' flow under gravity into the respective combustion sections CO by means of one or more transfer legs 7 and 7'. In the embodiment of FIG. 1, the two catalysts with different compositions are introduced and respectively confined in the combustion zones 8 and 8' of stage Z1. The zones 8, 8', which are semi-annular in shape, are defined by two cylindrically shaped sieves which are permeable to gas 9, 9' and impermeable to catalysts. As an example, the sieves 9 and 9' may take the form of a screen or a perforated plate. The screen may be a Johnson type screen which is well known to the skilled person. It should be noted that the shape of the zones 8, 8' is not necessarily semi-circular; it may be U-shaped.

Figure 2:
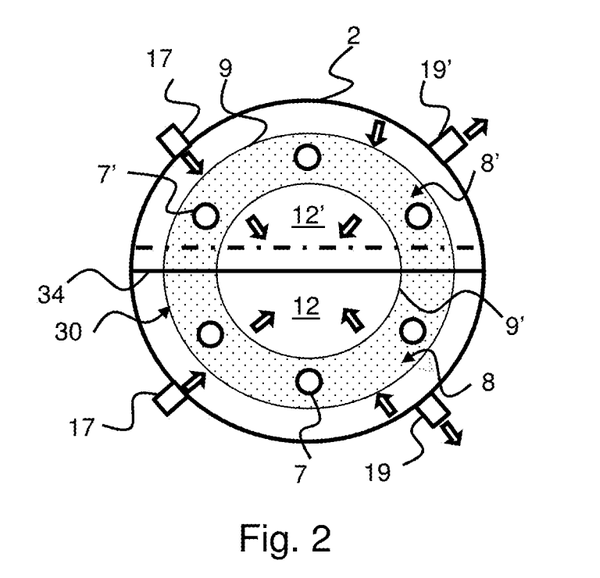
FIG. 2 is a sectional view in a plane perpendicular to the vertical axis of the regenerator of FIG. 1 in the combustion zone.

Referring to FIG. 2, which represents a sectional view in a plane perpendicular to the vertical axis of the gravity flow catalyst regenerator of FIG. 1, at the combustion section CO, it will be observed that the annular space 30, which is common to the combustion sections, is defined by two sieves 9 and 9' which are permeable to gas and impermeable to catalysts. The sieves 9 and 9' are disposed in a concentric manner. The annular space 30 is also divided into two semi-annular zones (or compartments) 8 and 8' the volumes of which are substantially equal, by a separation means 34 which is impermeable to catalysts. The separation means 34, which extends over the entire height of the annular space 30, may be a solid plate, for example, or optionally a perforated plate the dimensions of the orifices of which are smaller than the smallest dimension of the catalysts. The semi-annular zones (or compartments) 8 and 8' are designed to respectively contain the catalysts with different compositions without there being any mixing between the two types of catalyst. As indicated in FIG. 2, the semi-annular zones (or compartments) 8 and 8' are respectively connected to at least one supply conduit 7 and 7' for introducing the catalysts with different compositions into each of said zones (or compartments). The central spaces 12 and 12', located between the separation means 34 and the interior sieve 9', are spaces for collecting combustion gas.

As can be seen in FIG. 2, the separation means 34 is fixed to the vessel 2. This embodiment is advantageous when two combustion gases with different compositions are used, which gases are specific for treating the catalysts contained in the semi-annular zones 8 and 8', which may then be recovered without mixing in the gas collection spaces 12 and 12'.

Alternatively, the separation means 34 is not fixed to the vessel 2. This embodiment is advantageous when it is not necessary to use combustion gases with different compositions to burn off the coke deposited on the catalysts with different compositions contained in the zones (or compartments) 8 and 8'.

Alternatively, and as indicated in FIG. 2, the separation means 34 (indicated as a dashed line) is not necessarily arranged so as to pass through the centre of the vessel 2, but its position may be offset with respect to the centre in a manner so as to separate the annular space 30 into two different ring portions with different volumes.

Figure 3:
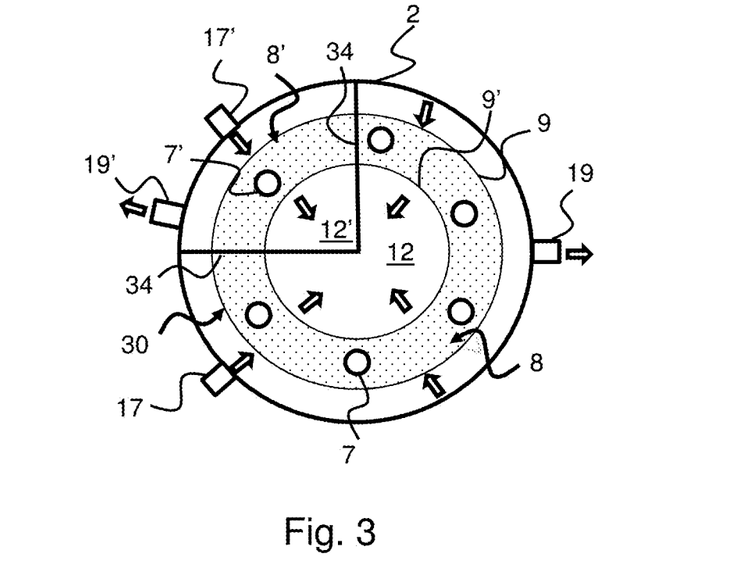
FIG. 3 is a sectional view in a plane perpendicular to the vertical axis of a regenerator in accordance with another embodiment of the combustion zone.

In accordance with another embodiment shown in FIG. 3, the separation means comprises two plates passing through the annular space 30 and with a length equal to the radius of the vessel 2. One end of the separation plates 34 is fixed to the vessel 2 and their other ends are fixed to each other. This embodiment is advantageous as, depending on the angle formed by the separation means 34 with each other, it is possible to divide the annular space 30 into ring portions with different angles and thus with different volumes. In the example described with reference to FIG. 3, the annular space 30 is divided into two zones (or compartments) 8 and 8' the corresponding volumes of which respectively correspond to ¾ and ¼ of the total volume of the annular space 30.

As indicated in FIGS. 1, 2 and 3, the combustion section CO of each of the regeneration zones comprises at least one combustion gas injection means 17, 17'. This embodiment is advantageous, as it not only means that the gas flow rates in the various combustion zones can be regulated as a function of the gravitational flow rate of the catalyst, but also that gases with different compositions can be used, depending on the quantity of coke deposited on the catalysts. Referring to FIGS. 2 and 3, the combustion section of each of the regeneration zones also comprises at least one means 19 and 19' for evacuating the combustion gas. Preferably and in the case in which different combustion operating conditions are to be used (temperature, gas flow rate, composition of combustion gas) to regenerate the catalysts in the combustion sections, the separation means is not only impermeable to catalysts but also impermeable to gas.

Figure 4:
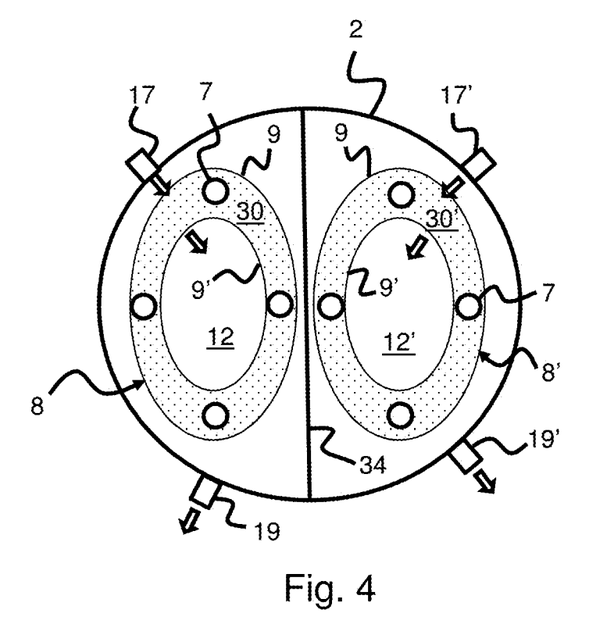
FIG. 4 is a sectional view in a plane perpendicular to the vertical axis of a regenerator in the combustion zone in accordance with an alternative embodiment.

FIG. 4 represents another alternative embodiment of the combustion sections CO of the regeneration zones which differs from that of FIGS. 1 to 3 in that each combustion zone CO is completely independent of the other and configured to contain catalysts with different compositions. Each combustion zone (or compartment) 8 and 8' respectively comprises an annular space 30 and 30' defined by two screens 9 and 9' which are cylindrical in shape and disposed in a concentric manner. Each internal space 12 circumscribed by the internal screen 9' acts as a space for collecting combustion gases which pass through the annular spaces 30 and 30'. The combustion zones (or compartments) 8, 8' are also equipped with at least one catalyst inlet means 7. The combustion section CO further comprises at least means 17 and 17' for supplying combustion gas and at least means 19 and 19' for evacuating combustion gas. This embodiment is advantageous when it is not necessary to use a combustion gas with a different composition to treat the catalysts contained in the combustion zones 8 and 8'. In an alternative embodiment also shown in FIG. 4, the combustion zones 8 and 8' are defined by a separation means 34, for example a solid plate, which is fixed to the vessel 2 at its two ends. This type of embodiment is advantageous when combustion gases with a different nature and/or different operating conditions are employed in order to specifically treat the catalysts contained in the combustion zones 8 and 8'.

Referring now to FIG. 1, the space located between the external screen 9 and the vessel 2 is blocked off at its lower end by a plate 11. The central space circumscribed by the inner screen 9' is optionally blocked off at its upper end by a plate 13. The catalysts contained in the zones (or compartments) 8 and 8' are respectively transferred under gravity into the combustion zones (or compartments) 14 and 14' of the stage Z2 via the supply conduits 15 and 15'. The zones (or compartments) 14 and 14' preferably have the same design as the zones (or compartments) 8 and 8' of the stage Z1. In the embodiment of FIG. 1, the zones (or compartments) 14 and 14' are formed by an annular space defined by two sieves 16 and 16' which are permeable to gas and impermeable to catalysts, for example screens or two perforated plates, preferably cylindrical tubes disposed in a concentric manner. The annular space 30 is also divided into two semi-annular zones (or compartments) 14 and 14' the volumes of which are substantially equal, by a separation means 34 which is impermeable to catalysts.

In operation, a first flow of combustion gas containing oxygen is introduced into the vessel 2 at the head of stage Z1 via the means 17 and 17' for supplying combustion gas. In stage Z1, the flow of gas moves as shown by the arrows on FIG. 1, passing through the beds of catalyst contained in the combustion zones (or compartments) 8 and 8'. In fact, the impermeable plates 13 and 11 force the combustion gas arriving via the orifice to pass through at the periphery of the zones (or compartments) 8 and 8' into the spaces of the central collector 12 and 12', passing through the catalyst beds contained in the cylindrical spaces 8 and 8'. A second flow of combustion gas containing oxygen is introduced between stage Z1 and Z2 via the conduit 18. This second flow is mixed with the first flow of gas which has passed through stage Z1. In the same manner as for stage Z2, the combustion gas passes through the beds of catalyst contained in the spaces 14 and 14' as shown by the arrows indicated in FIG. 1. After passing through the beds of catalyst confined in the spaces 14 and 14', the combustion gas is collected in the collection spaces and is evacuated from stage Z2 via the conduits 19 and 19'. As indicated in FIG. 1, in the configuration in which the combustion zone contains two combustion stages Z1 and Z2, the regenerator further comprises an intermediate evacuation means 10 for combustion gas arranged between said stages. The combustion gas withdrawn via the intermediate evacuation means 10 is cooled by a gas containing fresh oxygen and then reintroduced into the regenerator via the conduit 18.

In accordance with another embodiment, the combustion section CO may be arranged in a manner such that the combustion gas moves from the inside to the outside through the zones (or compartments) 8, 8', 14 and 14'. Alternatively, the combustion sections CO may be arranged in a manner such that the gas flow is injected at the bottom of said sections and is evacuated from the head of said sections.

Referring to FIG. 1, the catalysts with different compositions contained in the combustion zones (or compartments) 14 and 14' of stage Z2 flow into the oxychlorination sections O via the conduits 20 and 20'. A plate 21 which is impermeable to gas is advantageously disposed between the combustion and oxychlorination sections O to prevent gas from moving between these two sections.

The oxychlorination sections O of the regeneration zones act to recharge the grains of catalyst with chlorine and to redisperse the active metal at its surface in order to improve the distribution of said metal in the grains of catalyst. In each oxychlorination section O, the catalysts flow in the respective zones (or compartments) 22 and 22' inside the reactor. The zones (or compartments) 22 and 22' are separated by a separation means 23 which is impermeable to catalysts, thereby forming two oxychlorination compartments in order to treat the catalysts with different compositions separately. As can be seen in FIG. 1, the bottom of each oxychlorination compartment 22 and 22' is provided with at least one conduit 24 and 24' which can be used to inject the oxychlorination gas into the oxychlorination compartments 22 and 22' respectively. Alternatively, the reactor may comprise an injection means for gas which is common to compartments 22 and 22', allowing the oxychlorination gas to be introduced. The oxychlorination gas comprises a chlorinated compound and may be at a temperature in the range 350° C. to 550° C., preferably in the range 460° C. to 530° C. At the head of each of the oxychlorination compartments 22 and 22' is at least one conduit 25 which can be used to evacuate the oxychlorination gas from the oxychlorination sections O. The oxychlorination gas injected via the conduits 24 and 24' moves in an upwards direction through the oxychlorination compartments 22 and 22' as a counter-current to the gravitational flow of the grains of catalyst and is evacuated from the vessel 2 via the conduit 25. It should be pointed out that the compositions and flow rates of the oxychlorination gases which are introduced via the conduits 24 and 24' may be the same or different.

The catalysts with different compositions arriving at the bottom of the oxychlorination compartments 22 and 22' continue to flow in the respective calcining sections CA which also comprise a calcining compartment 26, 26'. The calcining compartments 26 and 26' are separated from each other by a separation means 27 which is impermeable to the catalysts. The specific purpose of the calcining section CA is to dry the grains of catalyst. The calcining compartments 26 and 26' of the calcining section CA are provided with conduits 28 and 28' for injecting a calcining gas. The calcining gas is generally air, or air depleted in oxygen, and may be at a temperature in the range 400° C. to 550° C. The calcining gases which are introduced via the conduits 28 and 28' may have the same or a different composition and flow rates.

In order to distribute the calcining gas in a homogeneous manner in the bed of catalyst of the compartments 26 and 26', the conduits 28 and 28' may respectively open into a space 29 and 29' disposed at the periphery of the vessel 2. The spaces 29 and 29' are open at their lower portion located at the bottom of the compartments of the calcining section CA so that the gas injected via the conduits 28 and 28' is distributed in the beds of catalyst over the whole of the periphery from the bottom of the compartments 26 and 26'. The injected calcining gas thus moves in an upwards direction, as a counter-current to the gravitational flow of the catalyst, through the compartments 26 and 26' then through the compartments 22 and 22', thereby mixing with the oxychlorination gas, and is evacuated from the vessel 2 via the conduit 25. Alternatively, the calcining gas may be evacuated directly from the calcining compartments 26 and 26' without encountering the oxychlorination section. Alternatively, the calcining gas leaving each of the zones may be re-mixed before being redistributed into each of the oxychlorination zones (or compartments) 22 and 22'.

It is also possible to provide a mixing section between the oxychlorination section and the calcining section. The mixing section comprises, for example, a distributor plate designed to homogeneously mix the calcining gas with the oxychlorination gas and to distribute the gas mixture in a homogeneous manner.

Figure 5:
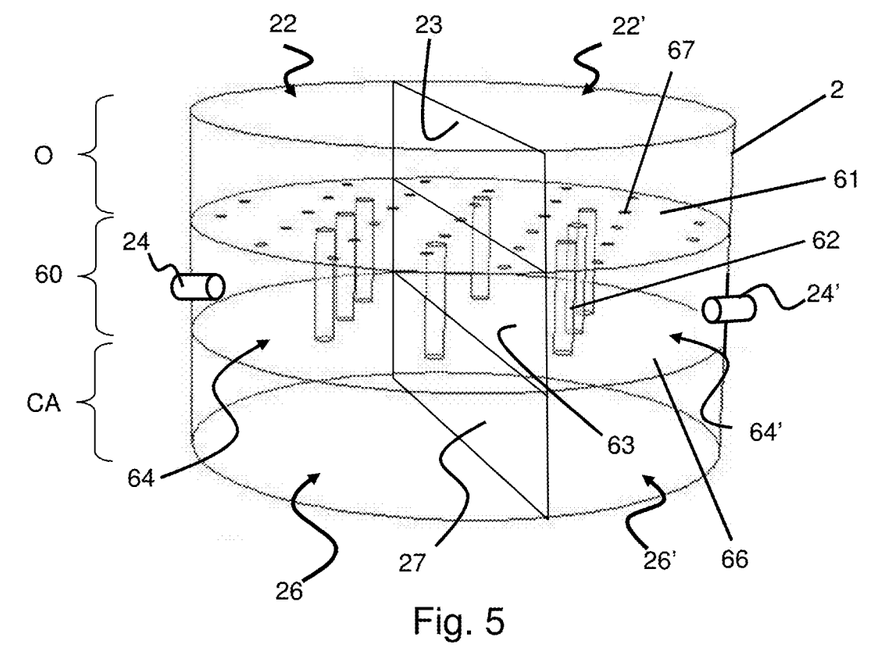
FIG. 5 is a perspective view of the oxychlorination and calcining zones of a regenerator in accordance with the invention.

FIG. 5 is a detailed perspective view of the mixing section disposed between the oxychlorination O and calcining sections of the regenerator of the invention.

Referring to FIG. 5, the mixing section 60 is positioned between the bottom of the oxychlorination sections O and the top of the calcining sections CA. The mixing section 60 is covered by a plate 61. The plate 61 is a plate which does not allow grains of catalyst to pass through. As an example, the plate 61 is a solid disk with a section equal to the section of the vessel 2. Alternatively, the plate 61 may be corrugated, for example forming cones or funnels around the tubes 62 described below.

The plate 61 is traversed by a plurality of tubes 62 which allow grains of catalyst to flow from the oxychlorination section O to the calcining section CA. The tubes 62 extend below the plate 61 over a height H. The number, position, section and/or height H of the tubes 62 are determined so as to ensure that the catalyst can flow between the oxychlorination section O and the calcining section CA. The mixing section 60 is also divided into two spaces or compartments 64 and 64' by a separation means 63, for example a plate 63, which is impermeable to gas and which extends over the height H of said mixing section 60. As indicated in FIG. 5, the separation means 63 is positioned in line with the separation means 23 and 27 which respectively separate the oxychlorination sections O and the calcining sections CA into two compartments.

The plate 61 associated with the tubes 62 and with the plate 63 can be used to define two mixing spaces 64 and 64'. The mixing spaces 64 and 64' extend over the height H of the tubes 62. In fact, the plate 61 associated with the tubes 62 can be used to prevent catalyst from getting into the mixing spaces 64 and 64' below the plate 61 over the height H. The tubes 62 may be substantially vertical. As an example, the axes of the tubes 62 form an angle in the range 0° to 15° with respect to the vertical direction. The conduits 24 and 24' pass through the vessel 2 and open into the compartments 64 and 64' of the mixing section 60 in order to introduce the oxychlorination gas into said compartments 64 and 64'. The lower portion of the compartments 64 and 64' allow gas to pass through. As an example, the lower portion is open. Thus, the calcining gas moving in an upwardly vertical direction in the compartments 26 and 26' of the calcining section CA moves into the mixing section 60 so as to mix the calcining gas with the oxychlorination gas in the mixing section 60 which is free of grains of catalyst, which means that good mixing of the gases is obtained. In addition, the conduits 24 and 24' can be used to constitute a side inlet for gas into the mixing section 60, i.e. the conduits 24 and 24' may be horizontal and pass through the vessel 2. The fact of injecting the oxychlorination gas laterally via the horizontal conduits 24 and 24' further improves mixing with the calcining gas moving as a cross-current with respect to the oxychlorination gas injected horizontally via the conduits 24 and 24'. Alternatively, a plate 66 may be provided which is permeable to gas over the lower surface of the mixing section 60. The plate 66, for example a screen or a perforated plate, allows the calcining gas to pass from the calcining section into the mixing section 60. In this particular case, the tubes 62 pass through the plate 66 to create a passage for grains of catalyst communicating between the oxychlorination sections O and the calcining sections CA. The perforated screen or plate can be used to introduce calcining gas at high speed without causing particles of solid to move from the bed of catalyst in the calcining section into the mixing section. In addition, the plate 66 may reinforce the mechanical strength of the plate 61 by fixing the tubes 62 on the one hand to the plate 66 and on the other hand to the plate 61.

As can be seen in FIG. 5, the plate 61 comprises a plurality of orifices 67 which allow the gas mixture to pass from the mixing section 60 into the oxychlorination section O. The dimensions of the orifices are such that they allow gas to pass while preventing the passage of grains of catalyst. Multiplying the gas injection points by means of the orifices 67 over the section of the reactor means that the distribution of the gas mixture over the whole section of the reactor is excellent. As an example, the orifices 67 may be provided with a device which is generally known as a "bubble cap", or any other system allowing gas but not grains of catalyst to pass through.

Alternatively, it is possible to use a mixing box type solution from document FR 2 993 794.

In the context of the invention, the regenerator may clearly comprise more than two regeneration zones so that one of the catalysts with different compositions can be separately regenerated in each of said zones.

Figure 6:
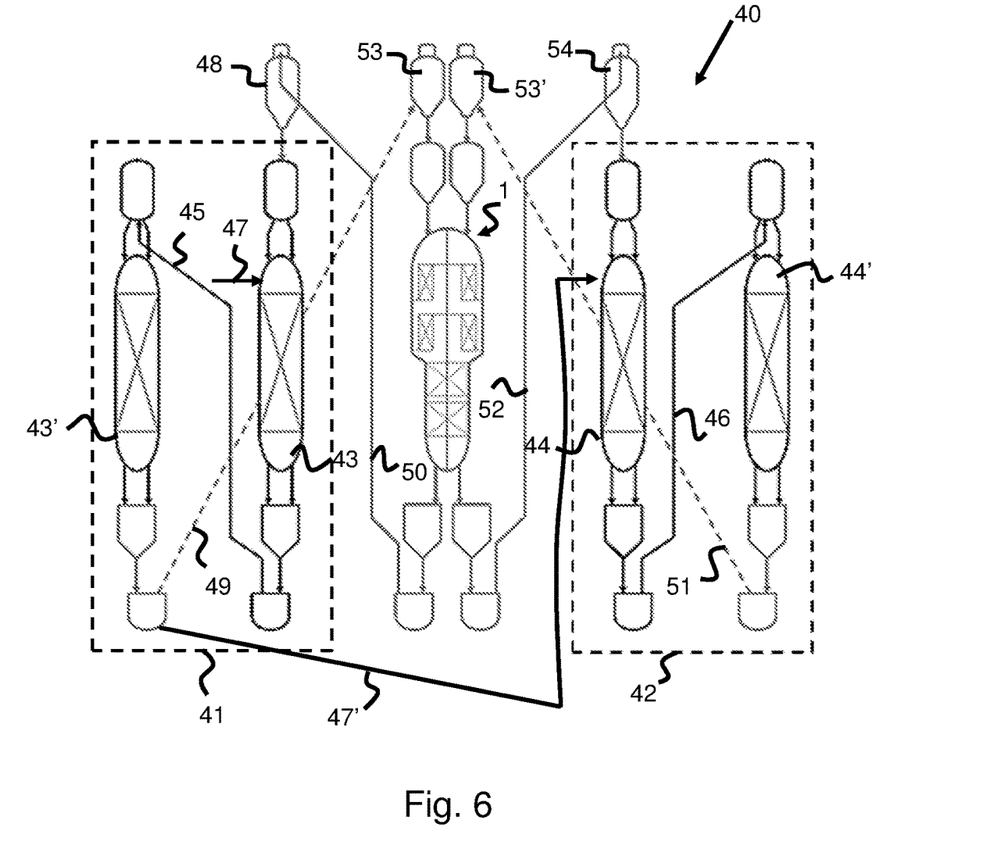
FIG. 6 is a simplified flowsheet for the process of the invention.

A catalytic reforming process using a regenerator of the invention is described below with reference to FIG. 6. The process of FIG. 6 is known as Continuous Catalytic Reforming (CCR), which means that the reaction is carried out in reaction sections in which the catalyst flows continuously from top to bottom and regeneration is carried out continuously in an associated reactor and the catalyst is recycled to the reaction sections in a manner that does not interrupt the reaction.

The reforming unit 40 comprises at least a first and a second reaction section 41 and 42. In FIG. 6, each reaction section 41 and 42 is composed of two moving catalyst bed reactors in series arranged side by side. More precisely, the first reaction section 41 comprises two moving bed reforming reactors 43 and 43', means (not shown in FIG. 6) for transferring effluent obtained from the bottom of the reactor 43 to the head of the reactor 43', means (not shown in FIG. 6) for transferring the effluent obtained from the bottom of the reactor 43' to the second reaction section 42 and means 45 for transferring the catalyst collected from the bottom of the reactor 43 to the top of the reactor 43'.

Similarly, the second reaction section 42 comprises two moving bed reforming reactors 44 and 44', means (not shown in FIG. 6) for transferring the effluent obtained from the bottom of reactor 44 to the head of reactor 44' and means 46 for transferring the catalyst collected at the bottom of reactor 44 to the top of reactor 44'.

In accordance with the invention, the first reaction section 41 may be used to employ a specific catalyst with a different composition from that of the catalyst used in the second reaction section 42.

Each of the reaction sections 41 and 42 also comprises means 49 and 51 for transferring the catalyst collected at the outlet from the last reactor of each of the reaction sections to a regenerator 1 in accordance with the invention which is capable of regenerating the catalysts used in the reaction sections at the same time and separately.

As indicated in FIG. 6, a pre-heated feed of hydrocarbons containing paraffinic compounds and naphthenes is sent via the line 47 with hydrogen to the head of the reactor 43 of the first reaction section 41. A first type of catalyst stored in an upper hopper 48 is introduced to the head of the reactor 43 in which it flows under gravity and leaves it via the bottom. The hydrocarbon feed is thus brought into contact with the moving bed of catalyst to produce a first reaction effluent which is withdrawn from the bottom of the first reactor 43. The catalyst and the first effluent, which is optionally reheated, obtained from the first reactor 43 are then sent to the head of the second reactor 43' in which they move in a downward movement. The first effluent is then brought into contact with the first type of catalyst in order to produce a second effluent which is withdrawn from the outlet at the bottom of said second reactor 43'. The first type of catalyst which is recovered from the bottom of the second reactor 43' is sent to a storage hopper 53 at the head of the regenerator 1 via a transfer means 49, for example a lifting device. The first catalyst is then regenerated in the regenerator 1 from which it is withdrawn and returned to the hopper 48 located above the first reactor 43 via the line 50.

The second effluent obtained from the second reactor 43' of the first reaction section 41 is sent to the head of the first reactor 44 of the second reaction section 42 in which it is brought into contact with a second type of catalyst contained in a moving bed flowing under gravity in order to produce a third effluent. The third effluent withdrawn from the bottom of reactor 44 is sent to the head of the second reactor 44' of the second reaction section 42 via the transfer means (not indicated in FIG. 6). The catalyst collected from the outlet from the bottom of reactor 44 is fed to the head of the reactor 44' via the transfer means 46 (for example a lift) and is brought into contact with the third effluent in order to produce a reformate which is withdrawn from the bottom of the second reactor 44' of the second reaction section 42. The catalyst which flows under gravity from reactor 44' is charged via the line 51 into a hopper 53' located at the head of regenerator 1. The second type of catalyst is regenerated in the regenerator 1 then sent to a hopper 54 disposed above the first reactor 44 of the second reaction section 42 via the line 52. The hoppers 53 and 53' for storing spent catalyst may be replaced by a single hopper comprising two storage compartments separated by a wall which is impermeable to the catalysts. In the same manner, the storage hoppers 48 and 54 for the regenerated catalysts may be substituted by a single hopper with compartments separated by a wall which is impermeable to the catalysts.

In an alternative embodiment, the process of the invention uses, in each reaction section, a reactor in which the moving catalytic beds are stacked vertically.

In another alternative embodiment, it is also possible to dispose the first and second reaction zones in a vertical configuration in a reactor with the first reaction zone 41 which is located above the second reaction zone 42.

Preferably, the moving bed or beds of the reaction zones are of the radial moving bed type in which the hydrocarbon feed moves through the catalytic bed in a radial flow path from the outer periphery of the bed towards the centre of the reactor which comprises a central effluent collector.

By way of example, the reaction sections are operated under the following operating conditions:

a mean inlet temperature in the reaction section in the range 470° C. to 570° C.;
    a pressure in the range 0.3 to 1.5 MPa;
    a (mass flow rate of feed/quantity by weight of catalyst) ratio in the range 1 to 10 $h^{-1}$;
    a $H_2$/hydrocarbons molar ratio in the range 0.8 to 8.

In the context of the invention, the process may comprise more than two reaction sections which each operate with catalysts with different compositions. As an example, the process may employ three or four reaction sections in series.

The process exemplified in FIG. 6 uses two moving beds of catalyst per reaction section. However, it is clearly possible to use one or more moving beds of catalyst per reaction section.

The hydrocarbon feed is generally a hydrocarbon cut of the naphtha type, rich in paraffinic and naphthenic compounds and relatively low in aromatic hydrocarbon compounds. The feed preferably has a distillation range in the range 50° C. to 250° C. A naphtha feed which may be treated by the process is, for example, obtained from atmospheric distillation of crude oil or a natural gas condensate. The process of the invention is also applicable to heavy naphthas produced by a catalytic cracking (FCC), cokefaction or hydrocracking unit, or indeed to steam cracked gasoline. Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

The entire disclosures of all applications, patents and publications, cited herein and of corresponding French Application No. 14/58503, filed Sep. 10, 2014 are incorporated by reference herein.

The invention claimed is:

1. A moving bed catalyst regenerator (1) comprising a vessel (2) extending in a vertical direction, said vessel being divided into at least two regeneration zones extending along the vertical height of said vessel, in which particles of catalyst move under gravity, the regenerator being configured such that each regeneration zone is capable of separately regenerating a different composition of catalyst and in which each regeneration zone comprises, in succession and in the order in which the catalysts move:
 a) a combustion section (CO);
 b) an oxychlorination section (O) disposed below the combustion section and comprising means for bringing catalyst from the combustion section (CO) to the oxychlorination section (O); and
 c) a calcining section (CA) disposed below the oxychlorination section.

2. The regenerator according to claim 1, in which each of the combustion sections comprises an annular space defined by two sieves which are permeable to gas and impermeable to catalysts in which the catalyst moves under gravity.

3. The regenerator according to claim 2, in which the sieves are selected from a screen and a perforated plate.

4. The regenerator according to claim 1, in which each of the combustion sections is formed by a portion of an annular space (30), the annular space (30) being defined by two sieves (9, 9') which are permeable to gas and impermeable to catalysts and divided into portions by separation means (34) which are impermeable to catalysts, said portions each being capable of containing a catalyst with a different composition.

5. The regenerator according to claim 1, in which each oxychlorination section is obtained by partitioning a zone of the vessel (2) into compartments (22, 22') by a separation means (23) which is impermeable to catalysts.

6. The regenerator according to claim 1, in which each calcining section is obtained by partitioning a zone of the vessel (2) into compartments (26, 26') by a separation means (27) which is impermeable to catalysts.

7. The regenerator according to claim 1, in which the oxychlorination section is separated from the calcining section by a mixing section which is configured to carry out mixing of oxychlorination gas with calcining gas.

8. A catalytic reforming unit (40) with continuous regeneration of catalyst comprising:
 at least a first reaction zone (41) and at least a second reaction zone (42), the first and second reaction zones respectively containing at least a first moving bed of a first catalyst and at least a second moving bed of a second catalyst the composition of which is different from that of the first catalyst; and
 a regenerator (1) according to claim 1, which is capable of simultaneously and separately regenerating the first and second catalysts.

9. The catalytic reforming unit (40) according to claim 8, in which the first and second reaction zones (41, 42) are disposed in a vertical stack in a reactor.

10. The catalytic reforming unit (40) according to claim 8, in which the first and second reaction zones (41, 42) are respectively disposed in at least a first reactor and at least a second reactor which are arranged side by side.

11. The catalytic reforming unit (40) according to claim 8, in which each of the moving beds of catalyst is contained in an annular space defined by two cylindrical screens which are spaced apart, said screens being permeable to gas and impermeable to catalysts.

12. A process for catalytic reforming of a hydrocarbon feed, comprising the following steps:
 a) treating the hydrocarbon feed in the presence of hydrogen in at least a first reaction zone (41) comprising at least one moving bed comprising a first catalyst;
 b) continuously and separately withdrawing an effluent and the first catalyst from the first reaction zone (41);
 c) treating the effluent obtained from the first reaction zone (41) in the presence of hydrogen in at least a second reaction zone (42) comprising at least one moving bed comprising a second catalyst with a composition which is different from that of the first catalyst;
 d) continuously and separately withdrawing a reformate and the second catalyst from the second reaction zone (42);
 e) sending the first and second catalysts to a regenerator (1) according to claim 1 and regenerating said catalysts; and
 f) separately sending the regenerated first and second catalysts to the respective first and second reaction zones (41, 42).

13. The process according to claim 12, in which the flows of the feed, the effluents and the first and second catalysts are as co-currents in a downward direction.

14. The process according to claim 12, in which the first and second reaction zones (41, 42) are disposed in a vertical configuration in a reactor with the first reaction zone (41) being located above the second reaction zone (42).

15. The process according to claim 12, in which the first and second reaction zones (41, 42) are disposed side by side respectively in at least a first reactor and at least a second reactor.

16. A moving bed catalyst regenerator (1) comprising a vessel (2) extending in a vertical direction, said vessel being divided into at least two regeneration zones extending along the vertical height of said vessel, in which particles of catalyst move under gravity, the regenerator being configured such that each regeneration zone is capable of separately regenerating a different composition of catalyst and in which each regeneration zone comprises, in succession and in the order in which the catalysts move:
 a) a combustion section (CO);
 b) an oxychlorination section (O) disposed below the combustion section and being capable of bringing catalyst from the combustion section (CO) to the oxychlorination section (O); and
 c) a calcining section (CA) disposed below the oxychlorination section.

17. The regenerator according to claim 16, in which each of the combustion sections is formed by a portion of an annular space (30), the annular space (30) being defined by two sieves (9, 9') which are permeable to gas and impermeable to catalysts and divided into portions by separators (34) which are impermeable to catalysts, said portions each being capable of containing a catalyst with a different composition.

18. The regenerator according to claim 16, in which each oxychlorination section is obtained by partitioning a zone of the vessel (2) into compartments (22, 22') by a separator (23) which is impermeable to catalysts.

19. The regenerator according to claim 16, in which each calcining section is obtained by partitioning a zone of the vessel (2) into compartments (26, 26') by a separator (27) which is impermeable to catalysts.

20. A catalytic reforming unit (40) with continuous regeneration of catalyst comprising:
- at least a first reaction zone (41) and at least a second reaction zone (42), the first and second reaction zones respectively containing at least a first moving bed of a first catalyst and at least a second moving bed of a second catalyst the composition of which is different from that of the first catalyst;
- a regenerator (1) according to claim 16, which is capable of simultaneously and separately regenerating the first and second catalysts;
- a line for transferring effluent obtained from the first reaction zone (41) to the second reaction zone (42);
- a line or lift (49) for bringing the first catalyst from the first reaction zone (41) to the regenerator (1);
- a line or lift (51) for bringing the second catalyst from the second reaction zone (42) to the regenerator (1);
- a line or lift (50) for transferring the regenerated first catalyst from the regenerator (1) to the first reaction zone (41);
- a line or lift (52) for transferring the regenerated second catalyst from the regenerator (1) to the second reaction zone (42).

\* \* \* \* \*